United States Patent [19]

Malkin

[11] 4,088,550

[45] May 9, 1978

[54] PERIODIC REMOVAL OF CATHODIC DEPOSITS BY INTERMITTENT REVERSAL OF THE POLARITY OF THE CATHODES

[75] Inventor: Irving Malkin, University Heights, Ohio

[73] Assignee: Diamond Shamrock Corporation, Cleveland, Ohio

[21] Appl. No.: 800,403

[22] Filed: May 25, 1977

[51] Int. Cl.$^2$ .......................... C25B 1/24; C25B 15/02
[52] U.S. Cl. ........................................ 204/95; 204/231
[58] Field of Search .......................... 204/231, 95, 275

[56] References Cited

U.S. PATENT DOCUMENTS

| | | | |
|---|---|---|---|
| 1,397,239 | 11/1921 | Slater | 204/275 |
| 1,585,716 | 5/1926 | Hulin | 204/231 |
| 3,450,605 | 6/1969 | McGivern, Jr. | 204/231 |
| 3,915,817 | 10/1975 | Bennett | 204/275 |

Primary Examiner—T. M. Tufariello
Attorney, Agent, or Firm—John P. Hazzard

[57] ABSTRACT

Electrolysis of impure solutions containing hardness impurities such as calcium and magnesium causes deposits to form on the cathodes of such an electrolysis cell which rapidly reduces the efficiency of the cell. The electrolysis cell of the instant invention contains a plurality of cathodes. The efficiency of such a cell is rejuvenated periodically by changing the polarity of less than the total number of cathodes in said cell so as to clean such cathodes while continuing normal operation of the cell by means of the remaining cathodes.

3 Claims, 1 Drawing Figure

PERIODIC REMOVAL OF CATHODIC DEPOSITS BY INTERMITTENT REVERSAL OF THE POLARITY OF THE CATHODES

BACKGROUND OF THE INVENTION

It is common practice to add chemicals to sewage in order to disinfect same prior to discharge thereof into the surrounding watershed. Recently, considerable attention has been directed to the on-site generation of such disinfecting materials, especially sodium hypochlorite, in electrolysis cells. Such on-site production is desirable owing to the problems and expense involved in shipping and storing dilute hypochlorite solutions and the danger in handling the more concentrated chlorine gas in urban areas. Such processes are particularly attractive in coastal locations where the salt values of seawater provide an economical source of the hypochlorite precursor, sodium chloride. Inland, electrolytes may be prepared from solid sodium chloride, whether pure or impure.

The electrolysis of seawater, brackish water, impure saltwater or other solutions containing hardness impurities leads to a pronounced problem, however, in the nature of the formation of heavy deposits on the electrode surfaces. It has been recognized, that calcium and magnesium impurities in the impure electrolytes can cause hardness deposits to build up on the cathode which leads to pronounced increases in operating cell voltages, thus decreasing cell efficiency and ultimately these buildups of hardness deposits grow to such a thickness as to impede or prevent electrolyte flow through the cell.

Various techniques have been proposed for removing the unwanted deposits from the cathode surfaces and these include mechanical removal of the deposits, acid washing of the cell to dissolve the deposits, intermittent air blasts to dislodge such deposits, intermittently halting electrolysis and flushing the cell to remove such deposits and many other techniques which have not been wholly satisfactory.

Typical prior art procedures are described in the patent literature. For example, U.S. Pat. No. 3,893,902 describes an anode-cathode arrangement for use in forming aqueous hypochlorite solution by seawater electrolysis with reduced formation of interfering deposits on the electrodes.

U.S. Pat. No. 3,974,051 describes a method of minimizing hardness-caused deposits on the cathodic surfaces of hypochlorite-producing electrolysis cells by utilizing extremely smooth cathodic surfaces in conjunction with high velocity electrolyte.

Full current reversal through the cell has also been utilized to remove electrode deposits.

None of the produced solutions have been totally satisfactory. Mechanical cleaning is expensive and time-consuming and acid cleaning can cause corrosion problems in the cell.

The procedures and arrangements described in the two abovementioned patents do not fully prevent hardness deposits and thus in time such deposits must be removed in order to regain cell efficiency. Current reversal, while useful in systems where anodes were changed frequently, is essentially ruled out in modern systems utilizing dimensionally stable anodes since such current reversal would quickly damage the anode. Additionally, many of these prior art proposals require stopping the operation of the cell which means decreased production and more expensive product.

BRIEF SUMMARY OF THE INVENTION

The electrolysis of saline solution produces chlorine gas and caustic. These electrolysis products then react or can be caused to react to form a sodium hypochlorite solution. The present invention is applicable to cells in which impure saline solution is electrolyzed, and more particularly to impure saline solutions containing hardness impurities consisting of dissolved calcium and magnesium ions. Since nearly all saline solutions available for the production of sodium hypochlorite contain such hardness impurities, the present invention is almost universal in application. At all concentrations of hardness a cathodic deposit will be formed in the electrolytic cell, the cathodic deposit will continue to grow with continued operation of said cell, increasing the voltage drop and decreasing the current efficiency of the cell. The rate of buildup of the cathodic hardness deposit, of course, depends on the concentration of hardness impurities in the fed electrolyte and, if allowed to continue unchecked, would ultimately result in deposits which would interfere with the flow of electrolyte through the cell.

The instant invention, therefore, contemplates the removal of these hardness deposits on the cathodes of an electrolysis cell by the periodic reversal of current through said cathodes. Current technology calls of the use of dimensionally stable anodes and long-life metallic cathodes, so as to maximize the life of the electrolytic cell. As mentioned earlier, current reversal through the cell has been used in the prior art to remove interfering electrode deposits. However, when using dimensionally stable anodes as well as metallic cathodes, full current reversal quickly destroy the activity and efficiency of the dimensionally stable anodes and also dissolves the metallic cathodes. The present invention avoids this situation by always maintaining the dimensionally stable anode as an anode while always operating at least some of a plurality of cathodes as cathodes. The hardness deposits on the cathodes are periodically removed by reversing the polarity on some of the plurality of cathodes while continuing to operate the remaining cathodes as cathodes. After the hardness deposits are removed, such cathodes are returned to the cathodic state and other cathodes can then be switched to the anodic state for cleaning.

As mentioned previously, current reversal can be detrimental to both anode and cathode and it is most particularly devastating to dimensionally stable anodes and to a much lesser extent to metallic cathodes. In the present invention, since the anode is always anodic, no damage would be done to such dimensionally stable anode when the current is reversed on the cathodes, and thus a much higher reverse current on the cathodes can be utilized than, for instance, when the polarity of the whole cell is reversed. Thus, it is clear that high currents can be utilized in the cathodes with minimal problems. However, it is suggested that the lowest possible reverse current through the cathodes be utilized to affect the desired results. This, of course, would depend on the concentration of hardness impurities in the electrolyte and the reverse current through said cathodes. The amount of current reversed through the cathodes during the cleaning operation can be varied easily. One method of doing it is to insert a variable resistor in the line from the primary rectifier back to the cathodes so that when the switch is thrown to convert the cathodes to anodic action, the variable resistance can be changed to alter the current flow in the reverse direction through the cathode. In large installations, other means of providing a small anodic current to some of the cathodes may be desirable, i.e., a separate and variable transformer and rectifier may be used to eliminate the power loss that would occur in a resistor.

Normally, such seawater cell or cells for the electrolysis of impure saline solutions, are operated at a current density in the range of about 0.2 to 1.0 amps per square inch. The preferred reverse current through the cathodes when they are acting anodically to remove the deposits is from about 15 milliamps per square inch to 200 milliamps per square inch. Operation in this range will normally be effective in removing the deposits in an appropriate time sequence and, if relatively pure saline solution is used, the amperage per square inch can be even lower.

DETAILED DESCRIPTION OF THE INVENTION

Figure 1:
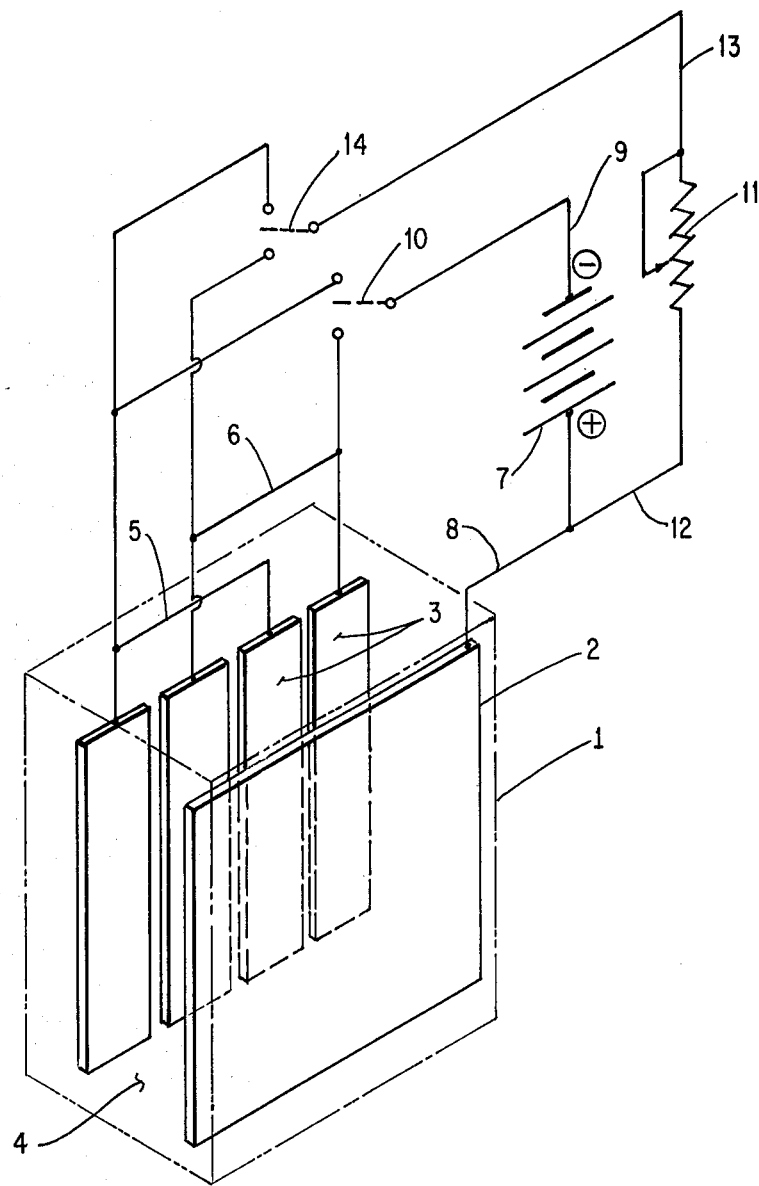
FIG. 1 is a schematic outline of a cell for the electrolysis of saline solution having a plurality of cathodes with a single anode, the polarity of the cathodes can be reversed for the removal of hardness deposits thereon resulting from the electrolysis of impure saline solutions.

On-site generation of sodium hypochlorite is becoming ever more popular since the electrolysis of saline solutions to produce sodium hypochlorite has become much more trouble free and more economic. On-site hypochlorite generation also avoids costly transportation of dilute hypochlorite solutions and also avoids the dangers inherent in chlorine gas.

Due to the development of dimensionally stable electrodes, continuous operation of a hypochlorite generation cell with minimal attention has become more of a reality. However, impurities normally found in saline solutions have precipitated in the electrolytic cell and formed interfering deposits on the electrodes. Generally, such deposits occur on the cathode or cathodes of the electrolytic cell and are caused by hardness impurities such as calcium and magnesium. Under normal conditions, the hardenss impurities causes the most trouble although other impurities can result in anodic and cathodic deposits which might ultimately interfere with the efficiency of the cell. Hardness-caused buildups gradually effect a loss in current efficiency and often ultimately grow to the extent that they would block electrolyte flow through the cell. In the past, such hardness buildups on the cathode have been handled in various ways. For example, cathodes have been made extremely smooth so that they resist the deposits adhering firmly thereto. Also, electrolyte flow has been speeded up past the cathodes so as to help in sweeping the cathode surface of deposits. Cathode deposits have also been acid washed to remove same and other successful control measures have been used in the past where downtime for the electrolytic cell is required.

Full current reversal through an electrolytic cell has also been utilized in the past to remove deposits from electrodes. However, as will be clearly described later in this specification, such full current reversal through the cell is most detrimental to continued operation of the cell since such current reversal has devastating results on the anode, particularly when it is a dimensionally stable anode, and also tends to dissolve the metallic cathodes used in present-day practice.

Essentially, the present invention provides a means to convert impure aqueous saline solution, especially seawater into a solution having microbicidal properties. This is accomplished by the relatively low-current density electrolysis of saline solution into a hypochlorite solution. The current density normally employed in such electrolysis is in the range of from about 0.2 to about 1.0 amps per square inch. Since nearly all saline solutions contain dissolved hardness ions, a calcium magnesium precipitate develops on the cathode or cathodes in the electrolytic cells which rapidly decreases the current efficiency of the process. When practicing the present invention, the electrolysis is allowed to continue until the current efficiency of the system drops to a preselected level. The preselected level can be a specific percentage of current efficiency or, when dealing with relatively consistent feed materials, the practice of the present invention can be done simply on a lapsedtime basis, after experience is gained regarding the rate of hardness buildup. Normally, the removal of the hardness deposits from the cathodes would be effected continuously so that while some of the cathodes are being cleaned, the remaining cathodes continue in the normal electrolysis. A preferred method is to operate half of the cathodes at any given time as cathodes while operating the remaining cathodes anodically to effect the removal of the hardness deposits.

The specific means employed for removing the hardness deposits from the cathodes in the instant invention is to reverse the current through the cathode or cathodes so as to render such cathodes anodic during cleaning and to keep them anodic for a sufficient period of time to remove the hardness deposit. By current reversal through the cathode it is not meant to be implied that either the full operating current is reversed or that the polarity of the anode is at any time changed. Although full operating current could be utilized to clean the cathodes, it is preferred to use somewhat less than full current in the cathode cleaning operation and preferably to lower such reverse current through the cathode or cathodes as much as possible so as to extend the life of the cathode or cathodes as long as possible.

FIG. 1 of the drawings illustrates but one embodiment of the instant invention. In FIG. 1, electrolytic cell consists of a housing 1 in which a single anode 2 and a plurality of cathodes 3 are placed with an appropriate electrodic gap between them and an aqueous electrolyte 4 is placed therein. Depending upon the specific electrolysis reaction, any gases formed during the reaction may be vented to the atmosphere or collected by appropriate means if the gases are toxic or otherwise dangerous. Cathodes 3 in the illustrated cell all are alternately interconnected by means of leads 5 and 6. Both leads 5 and 6 can be connected through switch 10 and bus 9 to the negative pole of the power source. Leads 5 and 6 may also be connected back to the positive pole of the power source via switch 14, bus 13, variable resistor 11 and bus 12. Anode 2 of the cell is permanently connected to the positive pole of the power source 7 via bus 8. In actual practice, two of the four illustrated cathodes 3 would be operating in the cleaning mode while the remaining two cathodes 3 would be operational as cathodes in the electrolytic cell.

As shown, the first and third cathodes 3 would be interconnected through leads 5 back through switch 10 and bus 9 to the negative pole of the power source 7. In this mode the first and third cathodes 3 are operating as cathodes in conjunction with anode 2 to effect the electrolysis. While this electrolysis is taking place, the second and fourth cathodes 3 would be interconnected via lead 6 through switch 14, bus 13, variable resistor 11 and bus 12 to the positive pole of the power source 7. Thus, a portion of the current from power source 7 would flow back through bus 12, variable resistor 11, bus 13, through switch 14 to make the second and fourth cathodes 3 become slightly anodic. After the laps of sufficient time to allow the cleaning of the hardness deposits from the second and fourth cathodes 3, switches 10 and 14 would be changed to have the second and fourth cathodes 3 act as cathodes in the electrolytic cell and have the first and third cathodes 3 then become slightly anodic to effect the cleaning of these cathodes. While most of the current from power source 7 flows through the electrolytic cell, and is used for electrolyzing the electrolyte to produce the desired product or products, a small portion of the current cycles through variable resistor 11 back to the slightly anodic cathodes in the cleaning mode. The amount of current required is primarily dependent on the purity of the electrolyte being fed to the cell, as well as the time available to affect the cleaning. By varying the resistance in variable resistance 11, the current flow to the cathodes in the cleaning cycle can be varied extensively to meet requirements. In actual practice, we have found that when operating half of the cathodes on a cleaning cycle at all times, a cleaning mode current of from 50 to 200 milliamps is entirely satisfactory even when using saline solutions containing rather high amounts or hardness impurities. When using a saline solution which is relatively pure in hardness impurities, lower currents may be used in the cleaning mode.

Switches 10 and 14 may be operated manually or automatically. Preferably, they are operated automatically on a timed sequence based on the impurity level in the saline solution being electrolyzed and since the impurity level is generally rather constant in a single source electrolyte, the timed cleaning operation can be run strictly on a timed cycle, once experience is gained with the system.

As noted previously, the electrolytic cells of the instant invention may be used for any electrolysis reaction using electrolytes which might cause buildup of deposits of dissolved elements such as calcium or magnesium. The cells may be used to treat sewage as in U.S. Pat. No. 3,943,044; to chlorinate swimming pools; to electrolyze seawater; to produce sodium hypochlorite; or to electrolyze aqueous alkali metal halides such as aqueous sodium chloride solutions to produce chlorine, etc.

The electrolytic cell used in the present invention to electrolyze the saline solution contains at least one anode and a plurality of cathodes. Normally, however, there would be an alternating array of preferably vertically-disposed anodes and cathodes spaced about 0.20 to 0.5 centimeters apart. The saline solution containing dissolved hardness impurities is passed between the electrodes and electrolyzed by a current in the range of from about 1½ to 25 amperes per square decimeter to produce chlorine and sodium hydroxide. A rapid chemical reaction then occurs to produce sodium hypochlorite at a concentration which depends on a variety of factors such as current density, electrolyte flow rate, temperature, and salinity.

By the term "impure saline solution," it is intended to refer to seawater, brackish water, or an aqueous solution prepared from impure salt, all of which contain hardness impurity which would, during normal electrolysis, be deposited on the cathodes of the electrolytic cell. Generally, the concentration of sodium chloride in the solutions for economic and practical reasons, will be within the range of 1–35 grams per liter.

The anodes employed are generally flat, and dimensionally stable, i.e., not significantly subject to chemical or mechanical attrition in use. The anode composition is not critical to the present invention as any electrically conductive substrate bearing an electro-catalytically active coating on the surface thereof, will generally suffice. Typical is titanium metal coated with titanium dioxide-ruthenium dioxide solid solution. While sheet or continuous anodes are satisfactory, superior results will be obtained if foraminous anodes are employed. This serves to increase inner electrode turbulence without detracting from uniformity of velocity, thereby further reducing cathodic deposits. In any event, the dimensionally stable anodes used in this invention would be subject to deactivation and destruction if the polarity of the anode was reversed.

The cathodes employed are preferably flat, in the sense of lying in one level plane, and continuous (not perforated or segmented). Preferably, the leading and terminal, i.e., vertical edges, are smooth and rounded rather than being angular. While it is generally stated that the smoother the surface of both anode and cathode, the better the results will be, a maximum roughness of less than $2.54 \times 10^{-4}$ centimeters is preferably employed. Such cathodes will be metallic for reasons including wear resistance, electrical conductivity, and low hydrogen over-voltage. Typical are titanium, nickel, and various ferrous and nickel alloys. Especially preferred is Hastalloy C, a trademark of Union Carbide Corporation for a nickel alloy. Since the surfaces are metallic, the low roughness values can generally be achieved with conventional metalworking techniques such as polishing or the like. Here again, if the current reversal is done at higher amperages, the electrodes, especially the Hastalloy C, would be dissolved and relatively quickly destroyed. For this reason, it is preferred to practice the present invention using minimal current in the cleaning mode.

The disposition and shape of the anodes and cathodes are not critical to the instant invention as the configurations and size thereof may vary widely.

EXAMPLE 1

For this example a cell of the type shown in FIG. 1 was assembled. It consisted of a foraminous anode (11 centimeters by 5 centimeters by 1½ millimeters thick) of titanium metal having a coating thereon of ruthenium oxide-titanium oxide in a mole E ratio of 2:1 and 6 cathodes of hastalloy C, each 1 centimeter by 5 centimeters by 1½ millimeters thick. The cathodes were lined in a plane parallel to the anode and spaced approximately 1 centimeter from each other with the gap between the anode and cathode plane being 2 centimeters. Means for continuously introducing and removing electrolyte to the cell containing the electrodes was provided.

The electrolyte consisted of 10 grams per liter sodium chloride which had been dissolved in tap water containing 100 parts per million of calcium and 40 parts per million of magnesium ion. The anode was operated at a current density of 0.075 amps per square centimeter.

Those cathodes operating anotically are adjusted to a current density of 0.005 amps per square centimeter. The mode of cathode operation is reversed for each cathode every 8 hours (3 cathodes operating normally and 3 cathodes operating anodically at any given time). After 1 week the cathodes remained clean of hardness deposits wereas when the same cathodes are operated in the standard manner without intermittently operating them anodically heavy buildup of hardness deposits occur on the cathode interfering greatly with current efficiency and cell operation.

All unstated conditions of operation are conventional and not critical to the present invention. For example, a pH within the range of 7.0 to 10 and temperatures of 5°–50° C are typically employed in the electrolytic production of sodium hypochlorite from sodium chloride solutions. In the following example, there is described the preferred embodiment of the present invention. However, it is to be understood that the invention is not intended to be limited to the specific embodiment described therein.

Various modifications of the cathodes and cells as well as the process of the instant invention may be made without departing from the spirit or scope thereof, and it is to be understood that the invention is intended to be limited only as defined in the appended claims.

What is claimed is:

1. An electrolytic cell for electrolyzing impure saline solutions containing hardness impurities comprising a cell body, an inlet opening in said cell body for supplying electrolyte in the form of impure saline solution thereto, an outlet opening in said cell body for discharging spent electrolyte therefrom, at least one anode having a dimensionally stable coating thereon within said cell body, at least two cathodes within said cell body, a direct current power source operatively connected to said electrodes and switching means interposed between said power source and said cathodes whereby each such cathode can be made anodic selectively and sequentially so as to remove hardness deposits therefrom while continuing electrolysis with at least one cathode, said anode always remaining anodic during electrolysis so as not to damage the dimensionally stable coating thereon.

2. The electrolytic cell for electrolyzing impure saline solutions of claim 1 wherein the switching means for selectively making said cathodes anodic includes a means for limiting the current flow to the cathodes to a level below 200 milliamps per square inch when said cathodes are in the anodic mode.

3. A process for electrolyzing impure saline solutions in an electrolytic cell having at least one anode and at least two cathodes comprising intermittently discontinuing the normal electrolysis with respect to at least one cathode by reversing the current flow in said cathode so that it acts as an anode for a time sufficient to remove hardness deposits therefrom while normal electrolysis between the permanent dimensionally stable anode and at least said one other cathode continues, thereafter sequentially reversing the current to the other said cathodes so as to remove hardness impurities therefrom while returning the previously cleaned cathode to cathodic service, and the anode remaining anodic throughout electrolysis.

* * * * *